United States Patent
Park et al.

(10) Patent No.: US 7,604,846 B2
(45) Date of Patent: Oct. 20, 2009

(54) MANUFACTURING METHOD OF COLORED DIAMOND BY ION IMPLANTATION AND HEAT TREATMENT

(75) Inventors: Jaewon Park, Daejeon (KR); Jaehyung Lee, Daejeon (KR); Changwon Sohn, Daegu (KR); Byungho Choi, Daejeon (KR)

(73) Assignee: Korea Atomic Energy Research Institute, Daejeon (KR)

( * ) Notice: Subject to any disclaimer, the term of this patent is extended or adjusted under 35 U.S.C. 154(b) by 729 days.

(21) Appl. No.: 11/068,942

(22) Filed: Feb. 28, 2005

(65) Prior Publication Data
US 2005/0196547 A1 Sep. 8, 2005

(30) Foreign Application Priority Data
Mar. 4, 2004 (KR) ............. 10-2004-0014557

(51) Int. Cl.
C23C 14/06 (2006.01)
C23C 14/14 (2006.01)
C23C 14/48 (2006.01)
C23C 14/58 (2006.01)

(52) U.S. Cl. .............. 427/523; 427/530; 427/377; 427/294

(58) Field of Classification Search ............... None
See application file for complete search history.

(56) References Cited

U.S. PATENT DOCUMENTS

| 1,287 | A | * | 8/1839 | Zeisse et al. | 126/58 |
| 5,306,529 | A | * | 4/1994 | Nishimura | 427/526 |
| 5,385,762 | A | * | 1/1995 | Prins | 427/526 |
| 5,538,911 | A | * | 7/1996 | Yamazaki | 438/26 |
| 5,702,586 | A | * | 12/1997 | Pehrsson et al. | 205/640 |

(Continued)

FOREIGN PATENT DOCUMENTS

EP 1 071 141 A2 * 1/2001

(Continued)

OTHER PUBLICATIONS

J. F. Prins "B3.2 Large Dopants in diamond",pp. 331-336, Jan. 2000 in Nazare et al., editors,"Properties,Growth and Applications of Diamond", INSPEC, The Institution of Electrical Engineers, London, United Kingdom, 2001 (no month).*

(Continued)

Primary Examiner—Marianne L Padgett
(74) Attorney, Agent, or Firm—Bachman & LaPointe, P.C.

(57) ABSTRACT

The present invention relates to a manufacturing method of colored diamond and, more particularly, to a manufacturing method of colored diamond by ion implantation and heat treatment. The manufacturing method comprises a first step of implanting ions to the surface of diamond by accelerating the ions under vacuum, and a second step of heat-treating the implanted diamond. By implanting ions inducing the change in the optical band gap of a diamond, the manufacturing method provides a colored diamond with relatively lower cost compared to a metal ion implantation in the prior art, and a uniform color is obtained by heat treatment. Additionally, the manufacturing method of the present invention provides a diamond having various colors with permanent color development effects, by controlling the condition of ion implantation and heat treatment.

3 Claims, 3 Drawing Sheets

U.S. PATENT DOCUMENTS

| | | | |
|---|---|---|---|
| 5,812,573 A * | 9/1998 | Shiomi et al. | 372/44.01 |
| 5,994,208 A * | 11/1999 | Prins | 438/527 |
| 6,756,086 B2 * | 6/2004 | Hasegawa et al. | 427/523 |
| 7,402,835 B2 * | 7/2008 | Liu et al. | 257/40 |
| 2003/0155654 A1 * | 8/2003 | Takeuchi et al. | 257/760 |
| 2008/0118966 A1 * | 5/2008 | Chang et al. | 435/173.1 |

FOREIGN PATENT DOCUMENTS

| | | | |
|---|---|---|---|
| JP | 06-166594 A | * | 6/1994 |
| KR | 2402 3447 A | * | 3/2004 |
| KR | 2004023447 A | * | 3/2004 |

OTHER PUBLICATIONS translation of previously cited/provided KR 2004023447 A to S.B. Hong & O.S. Song (on translation Song et al., note above citation in foreign documents is to correct previously incorrect document No. on the Jun. 26, 2008 PTO-892).*

* cited by examiner

Before heat treatment

After heat treatment
(650°C, 2hrs in argon)

MANUFACTURING METHOD OF COLORED DIAMOND BY ION IMPLANTATION AND HEAT TREATMENT

BACKGROUND OF THE INVENTION

1. Field of the Invention

The present invention relates to a manufacturing method of colored diamond and, more particularly, to a manufacturing method of colored diamond by ion implantation and heat treatment.

2. Description of the Prior Art

Generally, natural diamonds are collected in a wide range from a colorless state to a black color. Among the diamonds, a colorless diamond without impurities has the highest value and a diamond having a rare color has a higher value. However an artificially synthesized diamond for industrial use contains impurities such as materials used as catalysts, and thereby has a certain color. The artificial diamond has high hardness and acid-resistance, however the value of diamond as a jewel is far low. Accordingly, a method to solve the aforementioned problems has been developed by artificially coloring the low-valued natural and artificial diamonds using the technique described herein.

A conventional diamond coloring method includes radio-active irradiation, surface diffusion, and ion implantation.

Firstly, The radioactive irradiation utilizes the principle of coloring the non-metal gemstones by radiating high-energy particles onto the surface of the gemstones to induce point defects in the sub-surface to deeper inside from the surface of the gemstones. However the radioactivity is continuously emitted from the non-metal gemstones, and this method has a disadvantage that it takes a long period more than 10 years until the radioactivity is reduced to a safe level, considering the half-life period of the radioactive material.

It is reported that diamond color may change from pale yellow to fancy blue, green, brown, orange, very dark green, and yellow by collision with a high-energy particle such as electron, neutron, proton, gamma-ray, and alpha-particle. When the diamond is exposed to a gamma-ray (generally using $^{60}$Co), a blue or yellow color center is formed in the diamond having a brown or brownish green color appearance. Alternatively when the diamond is irradiated by an electron beam called Linac treatment, the diamond has a deep blue color, and an undesirable residual yellow color may be removed by the post-irradiation heat treatment. A blue color ranging from medium to dark-grayish blue may be obtained by irradiating the diamond by high-speed neutrons in a nuclear power reactor, and this color is named steely or inky. It is reported that the color remains for a long period even without the post-irradiation heat treatment. In the case of coloring a diamond in a nuclear power reactor, installation of Linac treatment and commercial transaction of the diamond need an approval of NRC regulation due to the radioactivity. A dark blue color may be obtained by complex processing of treatment in the nuclear power reactor, Linac treatment, and heat diffusion treatment. The color obtained by this process is named Electra blue, Super blue, New blue, Swiss blue, Max blue, American blue, or Super sky blue.

However, except the gamma-ray and neutron irradiation, the radioactive irradiation generally changes the color close to the surface of diamond and causes umbrella-like color zonation or irregular coloring.

Secondly, surface diffusion technique is a method to diffuse gaseous elements from the surface by heating the diamond in a furnace, where the gaseous metal elements may be applied in the circumference of diamond in the form of powder or liquid, and the diamond is heated up to a specific temperature. This method has an economical advantage that only a high temperature furnace avoiding oxidation of metal diffusates is required. However the method has a problem that differences in the diffusion rates due to the different crystallographic directions of the surfaces may cause irregular color changes, and the color changes are as little as it is unable to identify even with the naked eye in the case of a small jewel such as diamond. The method utilizes color development by coating and then baking, and the color may be nicely changed, if the coated layer is very sound. However, this method has a disadvantage that the appearance of jewel becomes to look bad and the color returns to its initial state, when the coated layer is worn out or peeled off.

In some instances, the diamond color is changed to colorless, pale pink, or pale blue by heating the diamond under high pressure to remove or to reduce the color centers. This method has been developed by GE, and the diamonds produced by this method is being sold by Pegasus Overseas Limited (POL), with a name of "GE POL".

Lastly, ion implantation is a method to implant metal ions accelerated under high vacuum to the surface of diamond, and has a characteristic that various color development are possible according to the kinds of ion. However this method has a disadvantage that an expensive ion implantation equipment is required and the depth of ion implantation is less than 1 µm, final color appearance of the diamond is inferior to that of natural diamond, and surface damage occurs during implantation.

SUMMARY OF THE INVENTION

An object of the present invention is to provide a manufacturing method of colored diamond having a uniform color by solving the problems in the conventional ion implantation. The colored diamond can also be manufactured by a simple process at low cost.

In order to achieve the above object, the manufacturing method of colored diamond in accordance with the present invention comprises a first step of implanting ions to the surface of diamond by accelerating the ions under vacuum, and a second step of heat-treating the ion implanted diamond.

DETAILED DESCRIPTION OF THE PREFERRED EMBODIMENTS

Figure 1:
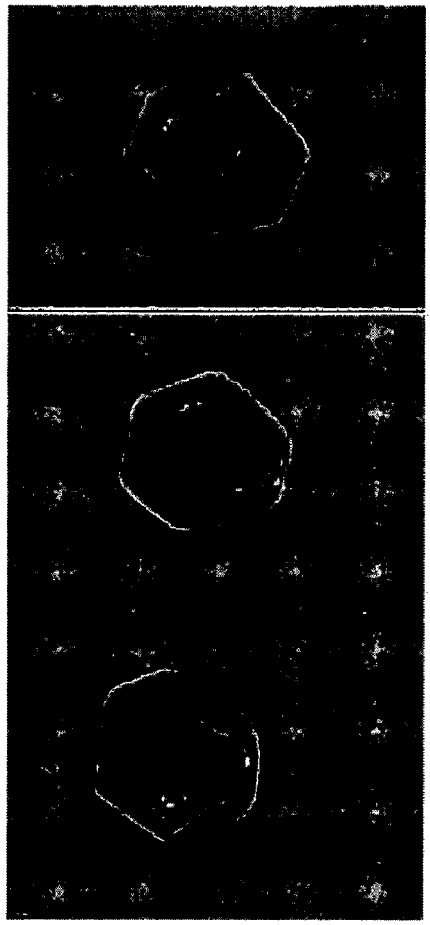
FIG. 1 is a photo showing color changes between a diamond right after implanting $10^{17}$ nitrogen ions/cm$^2$ and the diamond after a subsequent heat treatment at 650° C. for 2 hours in vacuum, in accordance with the present invention.
Figure 1:
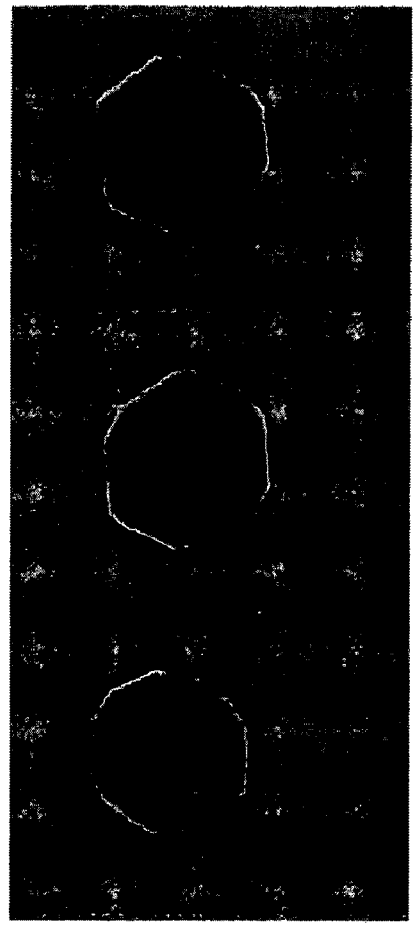

An example embodiment of the present invention will now be described more fully with reference to the accompanying drawings. It will be appreciated that the invention may be embodied in many different forms and should not be construed as limited to the particular embodiments set forth herein.

A manufacturing method of colored diamond in accordance with the present invention utilizes a phenomenon of color development by implanting ions to induce optical band gap in the diamond. The diamond color may be changed by adding impurities or producing the vacancies. If a specific ion is implanted into a lattice of diamond crystal consisted of carbon, the ion induced in the lattice act respectively as an electron donor or acceptor, and thereby the electrons in the valence band can be transited to the conduction band energy level even with visible lights, resulting in emitted color changes.

The present invention utilizes the above principle, and provides a manufacturing method of colored diamond in two steps.

In the first step, ions are accelerated in vacuum and implanted to the surface of diamond.

The ions induce changes of optical band gap in the diamond, and perform a role of inducing color development changes, by implanting the ions to the carbon lattice or forming a defective lattice in the crystal of diamond. All kinds of ion are applicable for forming the defective lattice. However an ion selected from the group including Be, B, N, O, Mg, Al, P, S, In, Sb, Te, Tl and Bi is preferably used and, more preferably, N or B is used. Alternatively, The ions may be implanted onto the surface of diamond in the form of single ion or multiple ions. Implanting quantity of the ions may be controlled according to the kinds of ion and the concentration of color, preferably in the ranges of implanting density of $5\times10^{15}$-$5\times10^{18}$ ions/cm$^2$ and ionic energy of 50-100 keV.

In this step, an ion implanter is utilized to implant the ions onto the surface of diamond, and a commercial ion implanter having a capacity lower than 100 keV may be used. An expensive ion implanter has to be used for the ion implantation in the prior art. However the present invention can solve the economical problem by using a low capacity ion implanter.

In the second step, the ion-implanted diamond is processed by heat treatment.

The heat treatment is performed to improve irregularly developed color to a uniform color in the diamond right after the ion implantation. The heat treatment diffuses the implanted ions and makes the distribution of ions uniform on the surface of diamond. The heat treatment is performed under vacuum or in inert gas atmosphere, and nitrogen helium or argon may be used as the inert gas. The heat treatment is performed at the temperature above 500° C. If the temperature is lower than 500° C., a uniform color may not be obtainable, because the implanted ions are not diffused satisfactorily.

Additionally, a permanent color developing effect may be obtained by properly controlling the condition of ions and heat treatment.

EXAMPLE 1

Manufacturing Colored Diamond

About 0.01 carat artificial and natural diamonds are located at an irradiation jig in a vacuum work chamber of an ion implanter, and implanted with ion density of $10^{17}$ ions/cm$^2$ and energy of 70 keV by separating univalent nitrogen ions from ions supplied from an ion source with a mass spectroscope and accelerating the ions. The implanted diamond with nitrogen ions is then heat-treated at 650° C. for 2 hours in argon atmosphere.

FIG. 1 shows photos of the diamond manufactured by the above method. The left and right photos show implanted diamonds respectively before and after the heat treatment.

When comparing the diamond before the heat treatment to that after the heat treatment, the diamond before the heat treatment has irregular color development, which is caused by a geometric factor of diamond. It is shown that the diamond color is changed to a uniform black color by the heat treatment in inert gas atmosphere. This indicates that the implanted nitrogen elements are uniformly distributed on the surface by diffusion. The diamond before the ion implantation shows a pale yellow color, which is caused by impurities such as boron in the manufacturing process of diamond.

EXPERIMENT 1

Chemical Analysis of Implanted Nitrogen by X-ray Photoelectron Spectroscope

N1s chemical state of the implanted nitrogen has been analyzed by X-ray photoelectron spectroscope to find out a mechanism of color development changes by heat treatment after nitrogen ion implantation. The X-ray photoelectron spectroscope used for the analysis is the model Phi 5800 of Physical Electronics. Chemical binding of nitrogen can be identified by radiating X-ray to a sample and measuring binding energy of is electron of nitrogen with the photoelectron spectroscope. If the nitrogen is bonded to a carbon in the diamond, it may be estimated that the color development is stable enough not to be influenced in normal use condition.

Figure 2A:
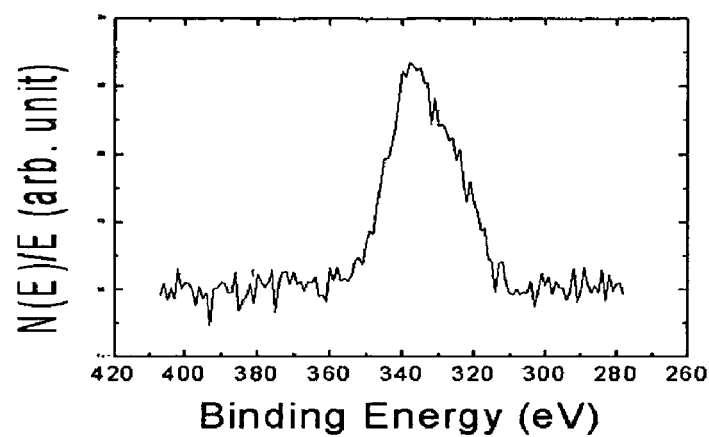
FIG. 2a is an analytical graph of X-ray photoelectron spectroscopy showing a chemical state of nitrogen in a colored diamond right after ion implantation, in accordance with the present invention.
Figure 2B:
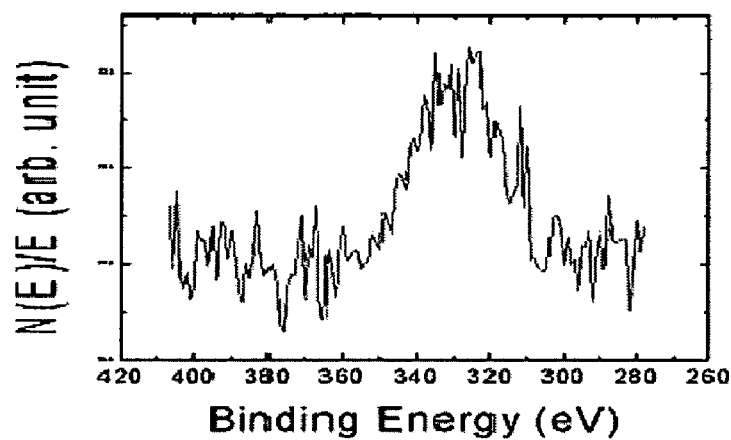
FIG. 2b is an analytical graph of X-ray photoelectron spectroscopy showing a chemical state of nitrogen in a colored diamond heat-treated at 650° C. for 2 hours in argon atmosphere after ion implantation, in accordance with the present invention.
Figure 2C:
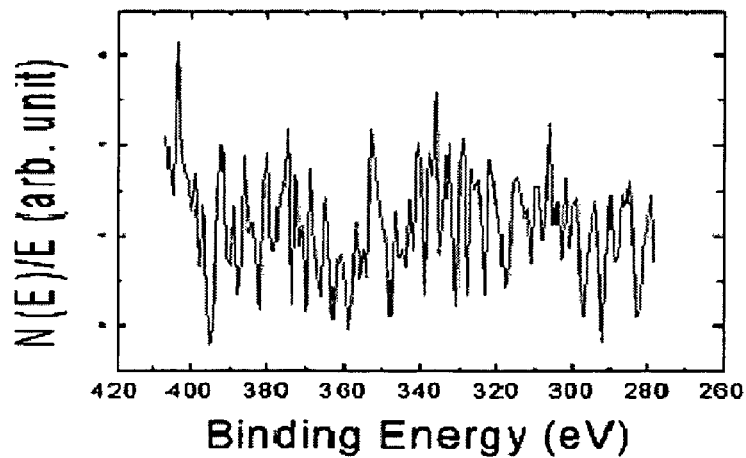
FIG. 2c is an analytical graph of X-ray photoelectron spectroscopy showing a chemical state of nitrogen in a colored diamond heat-treated at 650° C. for 2 hours in the air after the ion implantation, in accordance with the present invention.

FIGS. 2a, 2b, and 2c are spectroscopic graphs showing diamonds respectively right after the ion implantation, heat-treated at 650° C. for 2 hours in the argon atmosphere after the ion implantation, and heat-treated at 650° C. for 2 hours in the air after the ion implantation.

As shown in FIG. 2a, the presence of nitrogen element in the diamond right after implantation is distinct. It is estimated that a non-stoichiometric C—N compound is formed in the diamond, and thereby the diamond right after ion implantation shows irregular black color (photos on the left-hand side in FIG. 1).

As shown in FIG. 2b, the density of diamond heat-treated in argon atmosphere after implantation is decreased, showing a tendency to form a stoichiometric C—N ($C_3N_4$) compound. It may be identified that the heat-treated diamond shows a uniform black color, which is not a temporary color but a permanent color.

Comparing to the above results, FIG. 2c shows that nitrogen is not detected in the diamond heat-treated in the air after ion implantation.

EXPERIMENT 2

Measurement of Color Developing Effects According to Heat Treatment Atmosphere In order to identify the color developing effect according to heat treatment atmosphere, an appearance comparison has been performed between the diamond manufactured by the same method as Example 1 and the diamond manufactured by the same method as Example 1 but in the air instead of in argon atmosphere.

Figure 3:
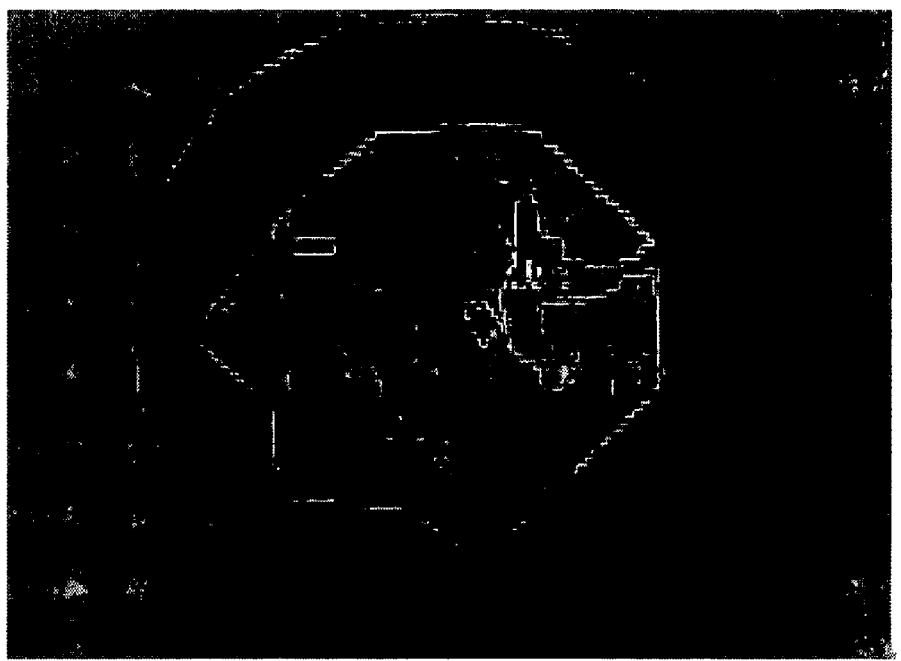
FIG. 3 shows photos of comparison between a colored diamond heat-treated in the argon atmosphere and a colored diamond heat-treated in the air, after the ion implantation, in accordance with the present invention.
Figure 3:

In FIG. 3, the upper photo shows a diamond manufactured by Example 1 and the lower photo shows a diamond heat-treated in the air.

As shown in FIG. 3, it is identified that the color development effect disappears, when the diamond is heat-treated in the air after nitrogen ion implantation. This indicates that the condition of heat treatment is important and the color developed by ion implantation returns to its initial state when the ion implantation is performed with nitrogen ion density of $10^{17}$ ions/cm$^2$ and heat treatment is performed at 650° C. for 2 hours in the air. It is estimated that the implanted elements are reduced by contacting with the air before forming a stable compound by a reaction with carbon, which is a structural component of the diamond. The reason why the center part of the black diamond appears with a different color in the photo is due to the reflection of light from a microscope. There is no difference if seen by the naked eye.

As described above, by implanting ions inducing an optical band gap in a diamond, the manufacturing method of colored diamond in accordance with the present invention provides a colored diamond with relatively lower cost compared to a metal ion implantation in the prior art, and a uniform color is obtained by heat treatment. Additionally, the manufacturing method of the present invention provides a diamond having various colors with a permanent color development effect, by controlling the condition of ion implantation and heat treatment.

What is claimed is:

1. A method for introducing color in a diamond comprising:
   providing a diamond having a surface;
   introducing color by implanting ions in a first step wherein the ions are selected from the group consisting of boron ions and nitrogen ions wherein the implantation is carried out with an ion density of $10^{17}$ ions/cm$^2$ into the surface of the diamond by accelerating the ions under vacuum conditions with an implantation energy in a range of between 50~100 keV in a single step; and
   heat treating the implanted diamond at a temperature in a range of 500° C.~650° C. under one of (a) vacuum and (b) an inert gas atmosphere for about 2 hours to produce a colored diamond.

2. A method for manufacturing a diamond of uniform color from a colorless diamond comprising:
   providing a colorless diamond having a surface;
   a first step of implanting ions selected from the group consisting of boron ion and nitrogen ion with an ion density of about $10^{17}$ ions/cm$^2$ into the surface of a colorless diamond by accelerating the ions under vacuum conditions with implantation energy in a range of 50~100 keV in a single step to produce a colored diamond of non-uniform color, and a second step of heat-treating the implanted diamond at the temperature in a range of 500° C.~650° C. under one of (a) vacuum and (b) an inert gas atmosphere for about 2 hours to obtain a uniform color in the colored diamond of non-uniform color obtained in the first step.

3. The method of claims 1 or 2 wherein the heat-treating is carried out under an inert gas atmosphere, wherein the inert gas is selected from the group consisting of helium and argon.

* * * * *

UNITED STATES PATENT AND TRADEMARK OFFICE
CERTIFICATE OF CORRECTION

| | | |
|---|---|---|
| PATENT NO. | : 7,604,846 B2 | Page 1 of 1 |
| APPLICATION NO. | : 11/068942 | |
| DATED | : October 20, 2009 | |
| INVENTOR(S) | : Park et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Fifth Day of October, 2010

David J. Kappos
*Director of the United States Patent and Trademark Office*